(12) United States Patent
Tokunaga et al.

(10) Patent No.: US 9,963,379 B2
(45) Date of Patent: *May 8, 2018

(54) ALKALI-FREE GLASS SUBSTRATE AND METHOD FOR PRODUCING SAME

(71) Applicant: ASAHI GLASS COMPANY, LIMITED, Tokyo (JP)

(72) Inventors: Hirofumi Tokunaga, Tokyo (JP); Akio Koike, Tokyo (JP); Masaya Kunigita, Tokyo (JP)

(73) Assignee: ASAHI GLASS COMPANY, LIMITED, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/605,217

(22) Filed: May 25, 2017

(65) Prior Publication Data

US 2017/0260085 A1  Sep. 14, 2017

Related U.S. Application Data

(63) Continuation of application No. 14/919,814, filed on Oct. 22, 2015, now Pat. No. 9,708,211, which is a continuation of application No. PCT/JP2014/061168, filed on Apr. 21, 2014.

(30) Foreign Application Priority Data

Apr. 23, 2013 (JP) ................... 2013-090141

(51) Int. Cl.
| | |
|---|---|
| C03C 4/00 | (2006.01) |
| C03C 3/085 | (2006.01) |
| C03C 3/091 | (2006.01) |
| C03C 3/11 | (2006.01) |
| C03C 3/118 | (2006.01) |
| C03C 3/087 | (2006.01) |

(52) U.S. Cl.
CPC ............ *C03C 4/0085* (2013.01); *C03C 3/085* (2013.01); *C03C 3/087* (2013.01); *C03C 3/091* (2013.01); *C03C 3/11* (2013.01); *C03C 3/118* (2013.01)

(58) Field of Classification Search
CPC ......... C03C 3/085; C03C 3/087; C03C 3/091; C03C 3/11; C03C 3/112; C03C 3/115; C03C 3/118; C03C 4/0085
See application file for complete search history.

(56) References Cited

U.S. PATENT DOCUMENTS

| | | | |
|---|---|---|---|
| 8,431,503 B2 | 4/2013 | Nagai et al. | |
| 9,108,879 B2 | 8/2015 | Tsujimura et al. | |
| 9,708,211 B2* | 7/2017 | Tokunaga | C03C 3/091 |
| 2012/0088648 A1 | 4/2012 | Ellison et al. | |
| 2012/0113032 A1 | 5/2012 | Itakura et al. | |
| 2013/0225390 A1 | 8/2013 | Ellison | |
| 2013/0274086 A1 | 10/2013 | Tsujimura et al. | |
| 2013/0296157 A1 | 11/2013 | Ellison et al. | |
| 2014/0287905 A1 | 9/2014 | Tokunaga et al. | |
| 2014/0366581 A1 | 12/2014 | Tokunaga et al. | |
| 2015/0045201 A1 | 2/2015 | Tokunaga et al. | |
| 2015/0045203 A1 | 2/2015 | Tokunaga et al. | |
| 2015/0072130 A1 | 3/2015 | Tokunaga et al. | |
| 2015/0087494 A1 | 3/2015 | Tokunaga et al. | |
| 2015/0087495 A1 | 3/2015 | Nishizawa et al. | |
| 2015/0093561 A1 | 4/2015 | Tokunaga et al. | |
| 2015/0175474 A1 | 6/2015 | Ellison et al. | |
| 2015/0299028 A1 | 10/2015 | Nishizawa et al. | |

FOREIGN PATENT DOCUMENTS

| | | |
|---|---|---|
| JP | 09-263421 | 10/1997 |
| JP | 10-045422 | 2/1998 |
| JP | 2006-036625 | 2/2006 |
| JP | 2006-036626 | 2/2006 |
| JP | 2009-053544 | 3/2009 |
| JP | 2009-184172 | 8/2009 |
| JP | 2012-82130 | 4/2012 |
| JP | 2012-104093 | 5/2012 |
| WO | WO 2012/103194 | 8/2012 |

OTHER PUBLICATIONS

International Search Report dated Jul. 15, 2014 in PCT/JP2014/061168 filed Apr. 21, 2014.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The present invention relates to an alkali-free glass substrate, having a strain point of 680° C. or higher, a Young's modulus of 78 GPa or greater, an UV transmittance at a wavelength of 300 nm of from 40% to 85% in terms of 0.5 mm thickness, an in-plane distribution of the UV transmittance at a wavelength of 300 nm in a G6-sized substrate of 1% or less in terms of 0.5 mm thickness, an average cooling rate around the glass transition point obtained according to a rate cooling method of 400° C./min or lower, and an in-plane distribution of the average cooling rate of 40° C./min or less.

12 Claims, No Drawings

ALKALI-FREE GLASS SUBSTRATE AND METHOD FOR PRODUCING SAME

CROSS-REFERENCE TO RELATED APPLICATIONS

This application is a continuation of U.S. application Ser. No. 14/919,814, filed on Oct. 22, 2015, which is a Continuation Application of PCT Application No. PCT/JP2014/061168, filed Apr. 21, 2014, the entire contents of which are incorporated herein by reference, which claims foreign priority to Japanese Application No. 2013-090141, filed on Apr. 23, 2013, the entire contents of which are incorporated herein by reference.

TECHNICAL FIELD

The present invention relates to an alkali-free glass substrate which is suitable as substrate glass for various kinds of displays, does not substantially contain an alkali metal oxide, and is easily formed to have a plate shape, and whose in-plane distribution of UV transmittance is suppressed.

BACKGROUND ART

Conventionally, substrate glass for various kinds of displays, particularly, glass on which surface a metal or oxide thin film is formed needs to be alkali-free glass which does not substantially contain alkali metal ions since film characteristics are degraded due to alkali metal ions being diffused in the thin film if an alkali metal oxide is contained.

When a flat panel display (FPD) represented by a liquid crystal display device (LCD) is produced, two sheets of substrate glass (in a case of an LCD, substrate glass provided with a TFT element and substrate glass provided with a color filter) constituting the FPD are bonded to each other by using a curable resin.

Here, since the FPD contains constituent elements such as a TFT element, which has a problem of heat resistance, a photo-curable resin is used as the curable resin and the resin is cured by applying UV rays. Accordingly, it is necessary for substrate glass for display to have UV-transmitting properties. Patent Documents 1 and 2 suggest alkali-free glass substrates whose UV transmittance at a wavelength of 300 nm is in the range of 50% to 85% in terms of 0.5 mm thickness.

The substrate glass for display preferably has a uniform UV transmittance over the entire surface of the substrate glass for display, that is, has a small in-plane distribution of UV transmittance, in addition to the UV transmittance falling within a desired range. For example, there has been a technique of polymer stabilized alignment (hereinafter, referred to as "PSA") in which a photopolymerizable monomer is added to liquid crystal materials filling a liquid crystal layer of an LCD and is made to form a polymer in the vicinity of an alignment film by applying light in a state in which liquid crystal molecules are tilted in a predetermined direction, thereby stabilizing the molecular alignment of the liquid crystal materials (see Patent Document 3). In order to deal with this technique, it is necessary for substrate glass for display to have a small in-plane distribution of UV transmittance. In the substrate glass for display, when the in-plane distribution of UV transmittance is large, the application conditions of UV rays need to be changed depending on the region of the substrate glass for display and thus the yield of a liquid crystal display panel is decreased.

Further, in the field of an LCD or an organic EL display device (OLED), particularly, mobile display devices such as a mobile and a mobile phone, an important issue is to reduce a weight and thickness of display devices. In order to deal with this issue, it is desirable to make the plate thickness of the substrate glass for display used for a display device smaller. As a method for making the plate thickness smaller, usually applied is a method of performing an etching treatment on substrate glass by using hydrofluoric acid or the like after or before a member for a display device is formed on the surface of the substrate glass, and further thinning by a physically polishing, if necessary.

However, when the substrate glass is made thinner by performing an etching treatment or the like before a member for a display device is formed on the surface of the substrate glass, the strength of the substrate glass is degraded and the deflection amount thereof becomes larger. This causes a problem of incapability of performing a treatment in the existing production line.

In addition, when the substrate glass is made thinner by performing an etching treatment or the like after a member for a display device is formed on the surface of the substrate glass, a problem that small scratches formed on the surface of the substrate glass during the process of forming the member for a display device on the surface of the substrate glass become apparent, that is, a problem of generation of an edge pit arises.

Then, for the purpose of solving such problems, there has been proposed a method of bonding substrate glass having a small plate thickness (thin substrate glass) to another supporting substrate glass to form a laminate, performing a predetermined treatment for producing a display device in this state, and then separating the thin substrate glass from the supporting substrate glass (see Patent Document 4).

As the method of separating the thin substrate glass from the supporting substrate glass, as in the method described in Patent Document 5, a method of scan-irradiating the surface of a substrate with laser beams can be used.

In order to deal with this technique, it is necessary for the substrate glass for display to have a small in-plane distribution of light transmittance. In the substrate glass for display, when the in-plane distribution of light transmittance is large, the application conditions of laser beams need to be changed depending on the region of the substrate glass for display and thus the yield of a display device is decreased.

PRIOR ART DOCUMENTS

Patent Documents

[Patent Document 1] JP-A-2006-36625
[Patent Document 2] JP-A-2006-36626
[Patent Document 3] JP-A-2009-53544
[Patent Document 4] JP-A-2009-184172
[Patent Document 5] JP-A-2012-104093

SUMMARY OF THE INVENTION

Problems that the Invention is to Solve

In recent years, for small high-resolution displays, for example, mobile terminals such as a smartphone, a method using laser annealing is employed as a method of producing high quality p-Si TFT. Further, in order to reduce the compaction, glass having a high strain point is demanded. In addition, with the tendency of increase in plate size and reduction in thickness of a glass substrate, in order to suppress the deflection of the glass substrate at the time of transportation, glass having a high Young's modulus and a high specific elastic modulus (Young's modulus/density) is demanded. An object of the present invention is to solve the above-described problems and to provide an alkali-free glass substrate having a high UV transmittance, a small in-plane distribution of the UV transmittance, a high strain point, and a high Young's modulus, and which can be easily formed to have a plate shape at the time of producing the substrate.

Means for Solving the Problems

In order to solve the above-mentioned problem, the present invention provides an alkali-free glass substrate, having a strain point of 680° C. or higher, a Young's modulus of 78 GPa or greater, an UV transmittance at a wavelength of 300 nm of from 40% to 85% in terms of 0.5 mm thickness, an in-plane distribution of the UV transmittance at a wavelength of 300 nm in a G6-sized substrate of 1% or less in terms of 0.5 mm thickness, an average cooling rate around the glass transition point obtained according to a rate cooling method of 400° C./min or lower, and an in-plane distribution of the average cooling rate of 40° C./min or less, and containing, on a mass percentage basis in terms of oxides:

| | |
|---|---|
| $SiO_2$ | 50 to 73; |
| $Al_2O_3$ | 10.5 to 24; |
| $B_2O_3$ | 0 to 5; |
| MgO | 0 to 10; |
| CaO | 0 to 14.5; |
| SrO | 0 to 24; |
| BaO | 0 to 20; |
| $ZrO_2$ | 0 to 5; |
| $SnO_2$ | 0.01 to 1; and |
| $Fe_2O_3$ | 0.005 to 0.1, | in which MgO+CaO+SrO+BaO is from 8 to 29.5.

The alkali-free glass substrate of the present invention preferably has a total amount of a halogen element of from 0.001% to 1%, on a mass percentage basis in terms of oxides.

The alkali-free glass substrate of the present invention preferably has an in-plane distribution of a content of Fe (on a mass percentage basis in terms of $Fe_2O_3$) of from 0.001% to 0.003%.

In order to solve the above-mentioned problem, the present invention also provides a method of producing an alkali-free glass substrate having a $SiO_2$—$Al_2O_3$—RO (RO is one or more kinds of MgO, CaO, BaO, and SrO)-based composition, containing:

a process of preparing glass raw materials so as to make alkali-free glass having a strain point of 680° C. or higher, a Young's modulus of 78 GPa or greater and an UV transmittance at a wavelength of 300 nm of from 40% to 85% in terms of 0.5 mm thickness, and containing, on a mass percentage basis in terms of oxides,

| | |
|---|---|
| $SiO_2$ | 50 to 73, |
| $Al_2O_3$ | 10.5 to 24, |
| $B_2O_3$ | 0 to 5, |
| MgO | 0 to 10, |
| CaO | 0 to 14.5, |
| SrO | 0 to 24, |
| BaO | 0 to 20, |
| $ZrO_2$ | 0 to 5, |
| $SnO_2$ | 0.01 to 1, and |
| $Fe_2O_3$ | 0.005 to 0.1, | in which MgO+CaO+SrO+BaO is from 8 to 29.5; and a process of managing temperature conditions at the time of forming and annealing such that an average cooling rate around the glass transition point obtained according to a rate cooling method is 400° C./min or lower, an in-plane distribution of the average cooling rate is 40° C./min or less, and an in-plane distribution of the UV transmittance at a wavelength of 300 nm in a G6-sized substrate is 1% or less in terms of 0.5 mm thickness.

In the method of producing an alkali-free glass substrate of the present invention, a total amount of a halogen element is preferably from 0.001% to 1% on a mass percentage basis in terms of oxides.

In the method of producing an alkali-free glass substrate of the present invention, an in-plane distribution of a content of Fe is preferably from 0.001% to 0.003% on a mass percentage basis in terms of $Fe_2O_3$.

Advantages Effects of the Invention

The alkali-free glass substrate of the present invention is easily formed to have a plate shape at the time of producing the substrate. Further, since the alkali-free glass substrate of the present invention has a high UV transmittance and a small in-plane distribution of the UV transmittance, the yield thereof is improved when used as substrate glass for FPD.

MODE FOR CARRYING OUT THE INVENTION

The alkali-free glass substrate of the present invention will be described.

The alkali-free glass substrate of the present invention (hereinafter, also referred to as a "glass substrate of the present invention") contains $SiO_2$, $Al_2O_3$, $SnO_2$, and $Fe_2O_3$ as indispensable components and contains $B_2O_3$, MgO, CaO, SrO, BaO, and $ZrO_2$ as optional components.

Next, the composition ranges of respective components will be described. When $SiO_2$ is less than 50% (% by mass, the same applies hereinafter unless otherwise noted), strain point is not sufficiently increased, thermal expansion coefficient is increased, and density is increased. It is preferably 52% or greater, more preferably 54% or greater, and still more preferably 56% or greater. When it exceeds 73%, meltability at the time of producing glass is degraded, temperature $T_2$ or temperature $T_4$ at which glass viscosity becomes $10^2$ dPa·s or $10^4$ dPa·s, respectively, are increased, and devitrification temperature is increased. It is preferably 70% or less, more preferably 68.5% or less, and still more preferably 67% or less.

$Al_2O_3$ suppresses phase separation of glass, decreases thermal expansion coefficient, and increases strain point. However, when it is less than 10.5%, these effects are less likely to be exhibited, and further, since another component increasing expansion coefficient is increased, the thermal expansion of glass becomes effectively increased. It is preferably 12.5% or greater, more preferably 14.5% or greater, and still more preferably 16.5% or greater. When it exceeds 24%, meltability of glass at the time of production may become degraded or devitrification temperature may be increased. It is preferably 23% or less, more preferably 22.5% or less, and still more preferably 22% or less.

$B_2O_3$ is not indispensable, but can be contained because it improves melting reactivity of glass at the time of production, decreases devitrification temperature, and improves BHF resistance. However, when the content thereof is excessively large, strain point is decreased and Young's modulus is decreased. Accordingly, it is set to 5% or less and preferably 4% or less. In order to obtain the above-described effects, it is preferably 0.5% or greater, more preferably 0.8% or greater, still more preferably 1% or greater, and particularly preferably 1.2% or greater.

Among alkaline earths, MgO has a characteristic of increasing Young's modulus while maintaining density to be low without increasing expansion coefficient and improves meltability at the time of producing glass. Thus it can be contained. However, when the content thereof is excessively large, devitrification temperature is increased. Accordingly, it is set to 10% or less, preferably 8% or less, more preferably 7.5% or less, and still more preferably 7% or less. In order to obtain the above-described effects, it is preferably 1% or greater, more preferably 2% or greater, and still more preferably 3% or greater.

Among alkaline earths, next to MgO, CaO has a characteristic of increasing Young's modulus while maintaining density to be low without increasing expansion coefficient and improves meltability at the time of producing glass. Thus it can be contained. However, when the content thereof is excessively large, devitrification temperature may be increased or a large amount of phosphorus which is an impurity in limestone ($CaCO_3$) serving as a raw material of CaO may be mixed. Accordingly, it is set to 14.5% or less, preferably 10% or less, more preferably 8.5% or less, and still more preferably 7% or less. In order to obtain the above-described effects, it is preferably 1% or greater, more preferably 2% or greater, and still more preferably 3% or greater.

SrO can be contained because it improves meltability at the time of producing glass without increasing devitrification temperature of the glass. However, when the content thereof is excessively large, expansion coefficient may be increased. Accordingly, it is set to 24% or less, preferably 12% or less, more preferably 10.5% or less, and still more preferably 9% or less. In order to obtain the above-described effects, it is preferably 1.5% or greater, more preferably 2% or greater, and still more preferably 2.5% or greater.

BaO is not indispensable, but can be contained in order to improve meltability at the time of producing glass. However, when the content thereof is excessively large, expansion coefficient and density of the glass are extremely increased. Accordingly, it is set to 20% or less, preferably 13.5% or less, more preferably 10% or less, still more preferably 8% or less, and particularly preferably 6% or less. In order to obtain the above-described effects, it is preferably 0.1% or greater, more preferably 0.5% or greater, and still more preferably 1% or greater.

$ZrO_2$ is set to 5% or less in order to decrease melting temperature at the time of producing glass or to accelerate crystal deposition at the time of firing. When it exceeds 5%, the glass becomes unstable or relative dielectric constant $\in$ of the glass is increased. It is preferably 1.5% or less, more preferably 1% or less, still more preferably 0.5% or less, and particularly preferably substantially not contained.

When the total content of MgO, CaO, SrO, and BaO is less than 8%, temperature $T_4$ at which glass viscosity becomes $10^4$ dPa·s is increased and lifetime of equipment used for forming glass in a plate shape or a housing structure of a float bath or a heater in a case of float forming may be extremely shortened. It is preferably 10% or greater, more preferably 11.5% or greater, and still more preferably 13% or greater. When it exceeds 29.5%, a problem in that thermal expansion coefficient cannot be decreased may arise. Accordingly, it is preferably 22% or less, more preferably 20% or less, and still more preferably 18% or less.

$SnO_2$ is preferably contained in order to improve clarity at the time of producing glass. $SnO_2$ generates $O_2$ gas in a glass melt obtained by melting glass raw materials. In the glass melt, $SnO_2$ is reduced to SnO at a temperature of 1450° C. or higher, generates $O_2$ gas, and has a function of making bubbles be greatly grown. The glass raw material is preferably melted at a temperature of 1500° C. or higher for the purpose of more effectively growing bubbles. The content of Sn in the glass is 0.01% or greater in terms of $SnO_2$. When $SnO_2$ is less than 0.01%, the clarity effect at the time of melting glass cannot be obtained. It is preferably 0.05% or greater and more preferably 0.1% or greater. When $SnO_2$ exceeds 1%, the glass may be colored or devitrification may occur. Therefore, the content of Sn in the glass is 1% or less, preferably 0.5% or less, and more preferably 0.3% or less, in terms of $SnO_2$.

The content of Sn is not an amount to be added in the glass raw materials but an amount remaining in the glass melt. The same applies to the content of Fe, content of F, and content of Cl described below.

In a case where glass contains $Sn^{4+}$, UV transmittance of the glass is increased due to Sn in the glass being oxidized and Fe being reduced during the process of cooling the glass.

$Fe_2O_3$ has functions of increasing temperature of molten glass in a melting tank at the time of producing glass and decreasing bed temperature in the melting tank due to infrared absorption effect of $Fe^{2+}$ ions. Accordingly, the content of Fe in glass is 0.005% or greater, preferably 0.01% or greater, more preferably 0.02% or greater, and particularly preferably 0.04% or greater, in terms of $Fe_2O_3$.

When the content thereof is excessively large, this may lead to a problem of coloration of glass or decrease in UV transmittance. Accordingly, it is set to 0.1%, and preferably 0.07% or less, more preferably 0.055% or less, and particularly preferably 0.045% or less.

In the alkali-free glass substrate of the present invention, halogen elements are not dispensable, but can be contained to improve clarity at the time of producing glass. As the halogen elements to be used for this purpose, F and Cl are preferable from a viewpoint of clarity.

When the content of F is less than 0.001% by mass, the clarifying function at the time of melting glass raw materials may be decreased. Accordingly, it is preferably 0.005% by mass or greater, more preferably 0.01% by mass or greater, still more preferably 0.02% by mass or greater, and particularly preferably 0.03% by mass or greater.

When the content of F exceeds 0.15% by mass, strain point of the glass to be produced is decreased. Accordingly, it is preferably 0.12% by mass or less and more preferably 0.1% by mass or less.

When the content of Cl is less than 0.001% by mass, the clarifying function at the time of melting glass raw materials is decreased. Accordingly, it is preferably 0.005% by mass or greater and more preferably 0.01% by mass or greater. When the content of Cl exceeds 0.35% by mass, moisture concentration in glass is decreased and thus the clarity is degraded. Accordingly, it is preferably 0.25% by mass or less and more preferably 0.2% by mass or less.

Further, it is preferable that the total content of the halogen elements is 0.001% by mass or greater. When the content is less than 0.001% by mass, the clarifying function at the time of melting glass raw materials is decreased. Accordingly, it is preferably 0.01% by mass or greater and more preferably 0.03% by mass or greater.

In addition, it is preferable that the total content of the halogen elements is 1% by mass or less. When the content exceeds 1% by mass, strain point may be extremely decreased. Accordingly, it is preferably 0.7% by mass or less and more preferably 0.5% by mass or less.

Further, in order not to degrade characteristics of a metal or oxide thin film to be provided on the glass surface at the time of producing a panel, the alkali-free glass substrate of the present invention does not contain an alkali metal oxide more than an impurity level (substantially not). Moreover, in order to facilitate recycling of the glass, it is preferable that $PbO$, $As_2O_3$, and $Sb_2O_3$ are substantially not contained.

Further, for the same reason described above, it is preferable that $P_2O_5$ is substantially not contained. The amount to be mixed as an impurity is preferably 23 ppm by mole or less, more preferably 23 ppm by mole or less, still more preferably 18 ppm by mole or less, and particularly preferably 11 ppm by mole or less.

In order to improve meltability, clarity and formability at the time of producing glass, the total amount of 5% or less of $ZnO$ and $SO_3$ can be added to the alkali-free glass substrate of the present invention in addition to the components described above.

The alkali-free glass of the present invention has a strain point of preferably 680° C. or higher, more preferably 690° C. or higher, still more preferably 700° C. or higher, and still more preferably 710° C. or higher.

The alkali-free glass of the present invention has a Young's modulus of preferably 78 GPa or greater, or 79 GPa or greater, or 80 GPa or greater, still more preferably 81 GPa or greater, and still more preferably 82 GPa or greater.

The alkali-free glass substrate of the present invention has a UV transmittance at a wavelength of 300 nm of 40% to 85% in terms of 0.5 mm thickness.

At the time of producing an FPD, UV rays to be used for bonding two sheets of substrate glass constituting the FPD to each other, are mainly UV rays having a wavelength around a wavelength of 300 nm. When two sheets of substrate glass have small UV transmittance at a wavelength of 300 nm, it takes a long time for two sheets of substrate glass to be bonded to each other by using a UV curable resin. In other words, even when the UV curable resin is irradiated with UV rays, the rays are easily absorbed by the substrate glass and thus it takes a long time for the resin to be cured.

Since the alkali-free glass substrate of the present invention has a UV transmittance at a wavelength of 300 nm of 40% or greater in terms of 0.5 mm thickness, it does not take a long time for a UV curable resin to be cured when it is used as substrate glass constituting an FPD.

The UV transmittance of glass substrate varies depending on the thickness of the substrate. In the present invention, in order to exclude the influence due to the thickness of the substrate, it is standardized as a UV transmittance in terms of 0.5 mm thickness.

The UV transmittance at a wavelength of 300 nm is preferably 45% or greater and more preferably 50% or greater.

In this case, when the UV transmittance is excessively high, at the time of application of UV rays, characteristics of a TFT element are changed, for example, a Vth characteristic shift in the oxide semiconductor occurs, and the characteristics of constituent elements of an FPD may be degraded.

Since the alkali-free glass substrate of the present invention has a UV transmittance at a wavelength of 300 nm of 85% or less in terms of 0.5 mm thickness, there is no concern that the constituent elements of an FPD with a problem of heat resistance are damaged at the time of application of UV rays. It is preferably 80% or less and more preferably 75% or less.

In addition to an UV transmittance at a wavelength of 300 nm being within the above-described range, the alkali-free glass substrate of the present invention has a small in-plane distribution of the UV transmittance. Specifically, the in-plane distribution of UV transmittance at a wavelength of 300 nm is 1% or less and preferably 0.5% or less in a G6-sized substrate (typically, 1850 mm×1500 mm) in terms of 0.5 mm thickness. Therefore, in a case of being used as a substrate glass constituting an FPD, the application conditions of UV rays do not need to be changed according to the region of the substrate glass.

The alkali-free glass substrate of the present invention has an in-plane distribution of UV transmittance at a wavelength of 300 nm of preferably 1% or less and more preferably 0.5% or less in a G7-sized substrate (typically, 1870 mm×2200 mm) in terms of 0.5 mm thickness, and more preferably 1% or less and more preferably 0.5% or less in a G8-sized substrate (typically, 2460 mm×2160 mm) in terms of 0.5 mm thickness.

In the present specification, not limited to the transmittance, the "in-plane distribution" indicates a difference between the maximum value and the minimum value among the values in the plane.

In the alkali-free glass substrate of the present invention, in order that the UV transmittance and the in-plane distribution thereof satisfy the above-described numerical ranges, the average cooling rate and the in-plane distribution thereof around the glass transition point obtained by a rate cooling method satisfy the conditions described below.

As a result of intensive research on the in-plane distribution of UV transmittance in an alkali-free glass substrate by the present inventors, the following findings were obtained.

(1) In the case where an alkali-free glass substrate contains Fe, UV transmittance thereof is changed depending on the ratio of divalent iron to the total iron (so-called Redox) contained in the alkali-free glass substrate. Accordingly, when in-plane distribution of Redox is present in the alkali-free glass substrate, in-plane distribution of the UV transmittance is generated.

Further, even when in-plane distribution is present in the content of Fe in the alkali-free glass substrate, the in-plane distribution of the UV transmittance may be generated. For this reason, it is preferable that the in-plane distribution of the content of Fe is also small. In this case, however, minimizing the in-plane distribution of the concentration of Fe to an extreme level accompanies difficulty in production. In the present invention, the in-plane distribution of the content of Fe (in terms of $Fe_2O_3$) is preferably from 0.001% to 0.003%. In order to achieve the in-plane distribution of the content of Fe (in terms of $Fe_2O_3$) being less than 0.001%, it is necessary to more decrease the cooling rate than in the condition described below or to greatly increase the heater density, which accompanies difficulty in production. Meanwhile, when it exceeds 0.003%, the in-plane distribution of the UV transmittance may be generated.

(2) Redox of an alkali-free glass substrate is changed depending on melting temperature or cooling rate at the time of producing glass and the in-plane distribution of Redox of the alkali-free glass substrate is mainly affected by the cooling rate at the time of producing glass.

(3) The cooling rate of glass is not uniform and depending on the process of producing glass, and the cooling rate varies depending on the temperature range. However, since a linear relationship is established between fictive temperature of glass obtained by being cooled (rate cooling) from a high temperature at a constant cooling rate and the cooling rate, the fictive temperature can be alternatively defined as a cooling rate at the time of rate cooling. In the present specification, this is set as an average cooling rate around glass transition point obtained by a rate cooling method. The average cooling rate around glass transition point obtained by a rate cooling method can be obtained by following the procedures described below in detail.

A test of cooling glass at a constant cooling rate is performed at 0.1° C./min, 1° C./min, 10° C./min, 100° C./min, and 1000° C./min after holding the glass at a temperature which is approximately 100° C. higher than the glass transition point for 10 minutes. The relationship between refractive index and the cooling rate can be obtained as a calibration curve by measuring the refractive indices of all sheets of glass. Subsequently, the refractive index of an actual sample is measured and the cooling rate thereof is obtained from the calibration curve.

Hereinafter, in the present specification, when the "average cooling rate" is noted, this term indicates the average cooling rate around glass transition point obtained by using the rate cooling method.

(4) When the average cooling rate is set to a predetermined numerical value or less and the in-plane distribution thereof is decreased, the in-plane distribution of Redox of an alkali-free glass substrate can be decreased and the in-plane distribution of UV transmittance can be decreased.

The alkali-free glass substrate of the present invention has the average cooling rate of 400° C./min or less and the in-plane distribution of the average cooling rate of 40° C./min or less.

When the average cooling rate of an alkali-free glass substrate is 400° C./min or less, UV transmittance of the alkali-free glass substrate falls within the above-described range and the in-plane distribution of the UV transmittance becomes smaller.

When the in-plane distribution of the average cooling rate of an alkali-free glass substrate is 40° C./min or less (±20° C./min or less), the in-plane distribution of UV transmittance of the alkali-free glass substrate becomes sufficiently small, and becomes 1% or less in a G6-sized substrate in terms of 0.5 mm thickness.

In the alkali-free glass substrate of the present invention, it is preferable that the average cooling rate is 300° C./min or less and the in-plane distribution of the average cooling rate is 40° C./min or less (±20° C./min or less), more preferable that the average cooling rate is 220° C./min or less and the in-plane distribution of the average cooling rate is 30° C./min or less (±15° C./min or less), and particularly preferable that the average cooling rate is 150° C./min or less and the in-plane distribution of the average cooling rate is 30° C./min or less (±15° C./min or less).

For example, the alkali-free glass substrate of the present invention can be produced according to the following method. Raw materials of respective components being normally used are prepared so as to have target components such that strain point is 680° C. or higher, Young's modulus is 78 GPa or greater, and UV transmittance at a wavelength of 300 nm is from 40% to 85% in terms of 0.5 mm thickness, continuously put this into a melting furnace, and heated in a temperature of from 1500° C. to 1800° C. to be melted. The molten glass is formed to have a predetermined thickness by using various forming methods (a float method, a down draw method, a fusion method, etc.) and cut after being annealed, thereby obtaining an alkali-free glass substrate.

In the present invention, the temperature conditions at the time of forming and annealing need to be managed such that the average cooling rate becomes 400° C./min or less, the in-plane distribution of the average cooling rate becomes 40° C./min or less, and the in-plane distribution of UV transmittance at a wavelength of 300 nm in a G6-sized substrate becomes 1% or less in terms of 0.5 mm thickness. Here, in order to decrease the in-plane distribution of the average cooling rate, it is preferable to heat a glass ribbon from the side surface side at the time of forming and annealing.

EXAMPLES

Hereinafter, examples 1, 3, 5, 7, 9, 11, 13, 15, 17, 19, 21, 23, 25, 27, 29, 31, 33, 35, 37, 39, 41, 43, 45, and 47 are Examples and examples 2, 4, 6, 8, 10, 12, 14, 16, 18, 20, 22, 24, 26, 28, 30, 32, 34, 36, 38, 40, 42, 44, 46, and 48 are Comparative Examples.

Raw materials of respective components are prepared to have a target composition and melted. In Examples, the heat retention in side wall portions of a forming furnace and an annealing furnace is strengthened, the temperature distribution of a heater in the annealing furnace is adjusted by focusing on the temperature distribution of glass, and the temperature distribution of the glass is made to be better (uniform) than that in the conventional art. In Comparative Examples, the heat retention of side wall portions of the forming furnace and the annealing furnace is as usual and the heat retention thereof is weak compared to that of Examples, and the temperature distribution of the heater in the annealing furnace is adjusted in the manner of the conventional art without focusing on the minute temperature distribution of glass.

Table 1 shows the glass compositions (unit: % by mass) of glasses 1 to 8, the thermal expansion coefficient (unit: ×10$^{-7}$/° C.) at a temperature of from 50° C. to 350° C., the strain point (unit: ° C.), the glass transition point (unit: ° C.), the specific gravity, the Young's modulus (GPa) (measured by an ultrasonic method), a temperature $T_2$ as an index of meltability (temperature at which glass viscosity η becomes 10$^2$ poise, unit: ° C.) and a temperature $T_4$ as an index of float formability and fusion formability (temperature at which the glass viscosity η becomes 10$^4$ poise, unit: ° C.) as values of high temperature viscosity, the devitrification temperature (unit: ° C.), and the photoelastic constant (unit: nm/MPa/cm) (measured by using a disk compression method at a measurement wavelength of 546 nm). Table 2 shows glasses used in Examples 1 to 48, the average cooling rate (unit: ° C./min), the in-plane distribution of the average cooling rate (unit: ° C./min), the average in-plane transmittance (unit: %) at a wavelength of 300 nm, and the in-plane distribution of the transmittance (unit: %) at a wavelength of 300 nm. In addition, the size of the glass used in each of Examples is the G6 size (1850 mm×1500 mm×0.5 mm).

The average in-plane transmittance and the in-plane distribution of the transmittance can be obtained by cutting a G6-sized plate into a plurality of samples of 50 mm×50 mm and measuring the transmittance and the refractive index of each sample. The transmittance of glass was measured by using a Hitachi ultraviolet-visible near-infrared spectrophotometer 4U-4100. The refractive index was measured by using a precision refractometer KPR-2000 manufactured by Shimadzu Device Corporation.

TABLE 1

| % by mass | Glass 1 | Glass 2 | Glass 3 | Glass 4 | Glass 5 | Glass 6 | Glass 7 | Glass 8 |
|---|---|---|---|---|---|---|---|---|
| $SiO_2$ | 60.9 | 60.9 | 61.3 | 61.3 | 60.5 | 59.3 | 61.6 | 63.6 |
| $Al_2O_3$ | 19.7 | 19.7 | 20.4 | 20.5 | 18.8 | 20.0 | 19.7 | 20 |
| $B_2O_3$ | 2.5 | 2.5 | 1 | 1 | 4.8 | 1.8 | 3.7 | 0 |
| MgO | 5.2 | 5.2 | 5.7 | 5.7 | 4.3 | 4.1 | 3.8 | 7 |
| CaO | 4.4 | 4.4 | 4.5 | 4.5 | 4.1 | 1.6 | 5.5 | 9.4 |
| SrO | 7 | 7 | 6.9 | 6.9 | 7.5 | 8.7 | 5.7 | 0 |
| BaO | 0 | 0 | 0 | 0 | 0 | 4.5 | 0 | 0 |
| $SnO_2$ | 0.20 | 0.18 | 0.15 | 0.10 | 0.10 | 0.05 | 0.03 | 0.50 |
| F | 0.07 | 0.07 | 0 | 0 | 0 | 0.07 | 0.07 | 0 |
| Cl | 0.2 | 0 | 0 | 0.06 | 0.06 | 0.2 | 0.2 | 0 |
| $Fe_2O_3$ | 0.04 | 0.015 | 0.04 | 0.015 | 0.008 | 0.027 | 0.05 | 0.017 |
| Average thermal expansion coefficient [$\times 10^{-7}$/° C.] | 39 | 39 | 39 | 39 | 39 | 40 | 39 | 40 |
| Strain point [° C.] | 710 | 710 | 723 | 723 | 693 | 712 | 715 | 733 |
| Glass transition point [° C.] | 775 | 775 | 790 | 790 | 750 | 793 | 762 | 792 |
| Specific gravity | 2.57 | 2.57 | 2.59 | 2.59 | 2.55 | 2.61 | 2.53 | 2.55 |
| Young's modulus [GPa] | 84 | 84 | 87 | 87 | 82 | 82 | 82 | 91 |
| $T_2$ [° C.] | 1650 | 1650 | 1650 | 1650 | 1640 | 1702 | 1660 | 1622 |
| $T_4$ [° C.] | 1290 | 1290 | 1295 | 1295 | 1287 | 1333 | 1300 | 1281 |
| Devitrification temperature [° C.] | 1280 | 1280 | 1290 | 1290 | 1235 | 1312 | 1265 | 1255 |
| Photoelastic constant [nm/MPa/cm] | 28 | 28 | 27 | 27 | 28 | 27 | 28 | 26 |

TABLE 2

| Examples | Used glass | Average cooling rate [° C./min] | Average cooling rate distribution [° C./min] | Average in-plane transmittance at 300 nm [%] | Transmittance distribution at 300 nm [%] |
|---|---|---|---|---|---|
| Example 1 | Glass 1 | 350 | 30 | 41.9 | 0.3 |
| Example 2 | | 350 | 120 | 41.9 | 1.1 |
| Example 3 | | 150 | 20 | 48.5 | 0.9 |
| Example 4 | | 150 | 50 | 48.5 | 2.2 |
| Example 5 | | 40 | 5 | 56.6 | 0.8 |
| Example 6 | | 40 | 50 | 56.6 | 4.8 |
| Example 7 | Glass 2 | 350 | 30 | 71.3 | 0.3 |
| Example 8 | | 350 | 100 | 71.3 | 1.1 |
| Example 9 | | 150 | 30 | 73.9 | 0.9 |
| Example 10 | | 150 | 50 | 73.9 | 2.2 |
| Example 11 | | 40 | 8 | 76.7 | 0.8 |
| Example 12 | | 40 | 50 | 76.7 | 4.8 |
| Example 13 | Glass 3 | 350 | 30 | 46.9 | 0.3 |
| Example 14 | | 350 | 100 | 46.9 | 1.1 |
| Example 15 | | 150 | 30 | 52.8 | 0.9 |
| Example 16 | | 150 | 50 | 52.8 | 2.2 |
| Example 17 | | 40 | 8 | 58.5 | 0.8 |
| Example 18 | | 40 | 50 | 58.5 | 4.8 |
| Example 19 | Glass 4 | 350 | 30 | 72.2 | 0.3 |
| Example 20 | | 350 | 100 | 72.2 | 1.1 |
| Example 21 | | 150 | 30 | 74.8 | 0.9 |
| Example 22 | | 150 | 50 | 74.8 | 2.2 |
| Example 23 | | 40 | 8 | 77.2 | 0.8 |
| Example 24 | | 40 | 50 | 77.2 | 4.8 |
| Example 25 | Glass 5 | 350 | 30 | 80.1 | 0.3 |
| Example 26 | | 350 | 100 | 80.1 | 1.1 |
| Example 27 | | 150 | 30 | 81.4 | 0.9 |
| Example 28 | | 150 | 50 | 81.4 | 2.2 |
| Example 29 | | 40 | 8 | 82.7 | 0.8 |
| Example 30 | | 40 | 50 | 82.7 | 4.8 |
| Example 31 | Glass 6 | 350 | 30 | 58.3 | 0.3 |
| Example 32 | | 350 | 100 | 58.3 | 1.1 |
| Example 33 | | 150 | 30 | 61.6 | 0.9 |
| Example 34 | | 150 | 50 | 61.6 | 2.2 |
| Example 35 | | 40 | 8 | 65.1 | 0.8 |
| Example 36 | | 40 | 50 | 65.1 | 4.8 |
| Example 37 | Glass 7 | 350 | 30 | 40.4 | 0.3 |
| Example 38 | | 350 | 100 | 40.4 | 1.1 |
| Example 39 | | 150 | 30 | 43.4 | 0.9 |
| Example 40 | | 150 | 50 | 43.4 | 2.2 |
| Example 41 | | 40 | 8 | 46.6 | 0.8 |
| Example 42 | | 40 | 50 | 46.6 | 4.8 |

TABLE 2-continued

| Examples | Used glass | Average cooling rate [° C./min] | Average cooling rate distribution [° C./min] | Average in-plane transmittance at 300 nm [%] | Transmittance distribution at 300 nm [%] |
|---|---|---|---|---|---|
| Example 43 | Glass 8 | 350 | 30 | 69.0 | 0.3 |
| Example 44 |  | 350 | 100 | 69.0 | 1.1 |
| Example 45 |  | 150 | 30 | 71.4 | 0.9 |
| Example 46 |  | 150 | 50 | 71.4 | 2.2 |
| Example 47 |  | 40 | 8 | 73.9 | 0.8 |
| Example 48 |  | 40 | 50 | 73.9 | 4.8 |

As is obvious from Tables, in all sheets of glass in Examples, since the in-plane distribution of the average cooling rate is 40° C./min or less and the in-plane distribution of the UV transmittance at a wavelength of 300 nm in a G6-sized substrate is 1% or less, it is considered that the yield thereof is improved when used as an FPD substrate glass.

The present invention has been described in detail with reference to specific embodiments thereof, but it will be apparent to a person skilled in the art that various changes and modifications can be made without departing from the spirit and scope of the present invention.

The present application is based on Japanese Patent Application No. 2013-090141 filed on Apr. 23, 2013, the contents of which are incorporated herein by reference.

INDUSTRIAL APPLICABILITY

Since the alkali-free glass substrate of the present invention is easily formed to have a plate shape and the in-plane distribution of UV transmittance is suppressed, it is suitable for a substrate glass for various kinds of displays.

The invention claimed is:

1. An alkali-free glass substrate, having a strain point of 680° C. or higher, a Young's modulus of 78 GPa or greater, an UV transmittance at a wavelength of 300 nm of from 40% to 85% in terms of 0.5 mm thickness,
wherein, at an average cooling rate around a glass transition point obtained according to a rate cooling method of 400° C./min or lower, the alkali-free glass substrate has an in-plane distribution of the UV transmittance at a wavelength of 300 nm in a substrate size of 1850 mm×1500 mm of 1% or less in terms of 0.5 mm thickness, and an in-plane distribution of the average cooling rate in the substrate size of 1850 mm×1500 mm of 40° C./min or less,
the alkali-free glass substrate comprising, on a mass percentage basis in terms of oxides:

| | |
|---|---|
| $SiO_2$ | 50 to 73; |
| $Al_2O_3$ | 10.5 to 24; |
| $B_2O_3$ | 0 to 5; |
| MgO | 0 to 10; |
| CaO | 0 to 14.5; |
| SrO | 0 to 24; |
| BaO | 0 to 20; |
| $ZrO_2$ | 0 to 5; |

-continued

| | |
|---|---|
| $SnO_2$ | 0.01 to 1; and |
| $Fe_2O_3$ | 0.005 to 0.1, | wherein MgO+CaO+SrO+BaO is from 8 to 29.5.

2. The alkali-free glass substrate according to claim 1, comprising, on a mass percentage basis in terms of oxides:

| | |
|---|---|
| $SiO_2$ | 56 to 67; |
| $Al_2O_3$ | 14.5 to 23; |
| $B_2O_3$ | 0 to 4; |
| MgO | 0 to 7; |
| CaO | 0 to 8.5; |
| SrO | 0 to 10.5; |
| BaO | 0 to 13.5; |
| $ZrO_2$ | 0 to 1; |
| $SnO_2$ | 0.01 to 0.5; and |
| $Fe_2O_3$ | 0.005 to 0.045, | wherein MgO+CaO+SrO+BaO is from 13 to 22.

3. The alkali-free glass substrate according to claim 1, having an in-plane distribution of a content of Fe of from 0.001% to 0.003% on a mass percentage basis in terms of $Fe_2O_3$.

4. The alkali-free glass substrate according to claim 1, wherein the amount of $Fe_2O_3$ is from 0.005% to 0.017%, on a mass percentage basis in terms of oxide.

5. The alkali-free glass substrate according to claim 1, comprising a total amount of a halogen element of from 0.001% to 1%, on a mass percentage basis in terms of oxides.

6. The alkali-free glass substrate according to claim 1, comprising a total amount of a halogen element of from 0.03% to 1%, on a mass percentage basis in terms of oxides.

7. The alkali-free glass substrate according to claim 1, comprising 0.03 to 0.15 mass % of fluorine.

8. The alkali-free glass substrate according to claim 1, comprising 0.01 to 0.35 mass % of chlorine.

9. The alkali-free glass substrate according to claim 1, wherein the average cooling rate around a glass transition point obtained according to a rate cooling method is 300° C./min or lower.

10. The alkali-free glass substrate according to claim 1, having the UV transmittance at a wavelength of 300 nm of from 45% to 85% in terms of 0.5 mm thickness.

11. The alkali-free glass substrate according to claim 1, having the Young's modulus of 80 GPa or greater.

12. The alkali-free glass substrate according to claim 1, having the strain point of 710° C. or higher.

* * * * *